(12) United States Patent
Kobayashi

(10) Patent No.: US 7,936,557 B2
(45) Date of Patent: May 3, 2011

(54) PORTABLE ELECTRONIC DEVICE

(75) Inventor: Daizo Kobayashi, Hirakata (JP)

(73) Assignee: Sanyo Electric Co., Ltd., Moriguchi-shi, Osaka (JP)

(*) Notice: Subject to any disclaimer, the term of this patent is extended or adjusted under 35 U.S.C. 154(b) by 156 days.

(21) Appl. No.: 12/498,488

(22) Filed: Jul. 7, 2009

(65) Prior Publication Data

US 2010/0014227 A1    Jan. 21, 2010

(30) Foreign Application Priority Data

Jul. 15, 2008   (JP) ................................ 2008-183707

(51) Int. Cl.
*H05K 7/16* (2006.01)
(52) U.S. Cl. .............. 361/679.01; 361/679.02; 396/423; 396/535; 348/373; 348/376; 49/348
(58) Field of Classification Search ............ 361/679.01, 361/679.02, 679.55, 679.56, 679.57, 679.58, 361/679.3, 679.19; 396/423, 535; 348/373, 348/376; 49/348
See application file for complete search history.

(56) References Cited

FOREIGN PATENT DOCUMENTS

| JP | 10-239746 A | | 9/1998 |
|---|---|---|---|
| JP | 11-054947 A | | 2/1999 |
| JP | 2008191377 | * | 8/2008 |
| WO | WO 2008099792 A1 | * | 8/2008 |

* cited by examiner

*Primary Examiner* — Jayprakash N Gandhi
*Assistant Examiner* — Ingrid Wright
(74) *Attorney, Agent, or Firm* — Westerman, Hattori, Daniels & Adrian, LLP

(57) ABSTRACT

The portable electronic device according to the present invention comprises a cabinet including an opening defined in a front surface thereof, a cover body opening and closing the opening of the cabinet, and a pivoting mechanism for pivotally supporting the cover body to the cabinet, the pivoting mechanism comprises a shaft and a pair of bearings supporting the shaft, the cabinet has an attaching part for attaching a string-like member, and the attaching part projects from the front surface of the cabinet. In this portable electronic device, the attaching part is disposed adjacent to the pivoting mechanism, the shaft which is a component of the pivoting mechanism includes a projecting part projecting toward the attaching part from one of the bearings closer to the attaching part, and the projecting part extends along a back surface which is a reverse side of the front surface of the cabinet.

5 Claims, 6 Drawing Sheets

PORTABLE ELECTRONIC DEVICE

The application No. 2008-183707 upon which this patent application is based, is hereby incorporated by reference.

BACKGROUND OF THE INVENTION

1. Field of the Invention

The present invention relates to a portable electronic device such as a digital camera, particularly to a portable electronic device capable of attaching a string-like member such as a strap.

2. Description of Related Art

Conventionally in portable electronic devices such as a digital camera, an attaching part for attaching a string-like member such as a strap projects from a cabinet surface. The attaching part and the cabinet are often made of resin.

However, the attaching part projecting from the cabinet surface may hit the ground when the portable electronic device is dropped. When the attaching part hits the ground, the attaching part made of resin is easy to break because the external force (colliding force) generated at the time of impact concentrates on the attaching part. In the case where the attaching part is unified with the cabinet, the external force concentrating on the attaching part can result in a plastic deformation of the cabinet made of resin, further resulting in breakage.

In order to prevent the attaching part and the cabinet from breakage, countermeasures which may be considered are thickening the attaching part and cabinet or adopting the attaching part and cabinet made by die casting to enhance the strength of the attaching part or the cabinet.

However, thickening the attaching part and the cabinet can result in an increase in size of the portable electronic device. Also, adopting the attaching part and the cabinet made by die casting can result in an increase in manufacturing cost.

SUMMARY OF THE INVENTION

In view of above, in the present invention, prevented is the plastic deformation and breakage of the cabinet due to the external force applied to the attaching part without an increase in size or manufacturing cost of the portable electronic device.

A first aspect of the present invention provides a portable electronic device comprising a cabinet including an opening defined in a front surface thereof, a cover body opening and closing the opening of the cabinet, and a pivoting mechanism for pivotally supporting the cover body to the cabinet, the pivoting mechanism comprising a shaft and a pair of bearings supporting the shaft, the cabinet having an attaching part for attaching a string-like member, the attaching part projecting from the front surface of the cabinet, wherein the attaching part is disposed adjacent to the pivoting mechanism, the shaft which is a component of the pivoting mechanism includes a projecting part projecting toward the attaching part from one of the bearings closer to the attaching part, and the projecting part extends along a back surface which is a reverse side of the front surface of the cabinet.

According to the portable electronic device of the first aspect of the present invention described above, since the projecting part of the shaft which is a component of the pivoting mechanism projects toward the attaching part from the one bearing which is closer to the attaching part while the projecting part extends along the back surface of the cabinet, the projecting part can receive the external force applied to the attaching part by supporting the back surface of the cabinet. It is thus possible to prevent the plastic deformation and breakage of the cabinet due to the external force. Furthermore, since the plastic deformation and breakage is prevented by means of the shaft which is necessary to pivotally support the cover body, the size or manufacturing cost of the electronic device does not increase.

A second aspect of the present invention provides the portable electronic device according to the first aspect described above wherein the projecting part of the shaft extends to a position corresponding to a region in which the attaching part is formed within the cabinet.

A third aspect of the present invention provides the portable electronic device according to the portable electronic device according to the second aspect described above wherein the projecting part of the shaft projects beyond the region in which the attaching part is formed within the cabinet.

According to the portable electronic device of the second or third aspect described above, even when a greater external force is applied to the attaching part, the projecting part of the shaft can receive the force by supporting the back surface of the cabinet. Therefore, it is possible to better prevent the plastic deformation and breakage of the cabinet due to the external force.

A fourth aspect of the present invention provides the portable electronic device according to the second or third aspect described above wherein the projecting part of the shaft has a tip portion supported by a third bearing.

According to the portable electronic device of the fourth aspect described above, it is possible to reduce the flexure of the shaft which occurs when the projecting part of the shaft receives the external force applied to the attaching part. Therefore, even when a greater external force is applied to the attaching part, the projecting part of the shaft can receive the force by supporting the back surface of the cabinet.

As described, according to the portable electronic device of the present invention, it is possible to prevent the plastic deformation and breakage of the cabinet due to the external force applied to the attaching part.

DETAILED DESCRIPTION OF THE PREFERRED EMBODIMENT

In a preferred embodiment discussed in detail below with reference to drawings, the present invention is implemented in a digital camera, which is a portable electronic device.

1. Structure of the Digital Camera

Figure 1:
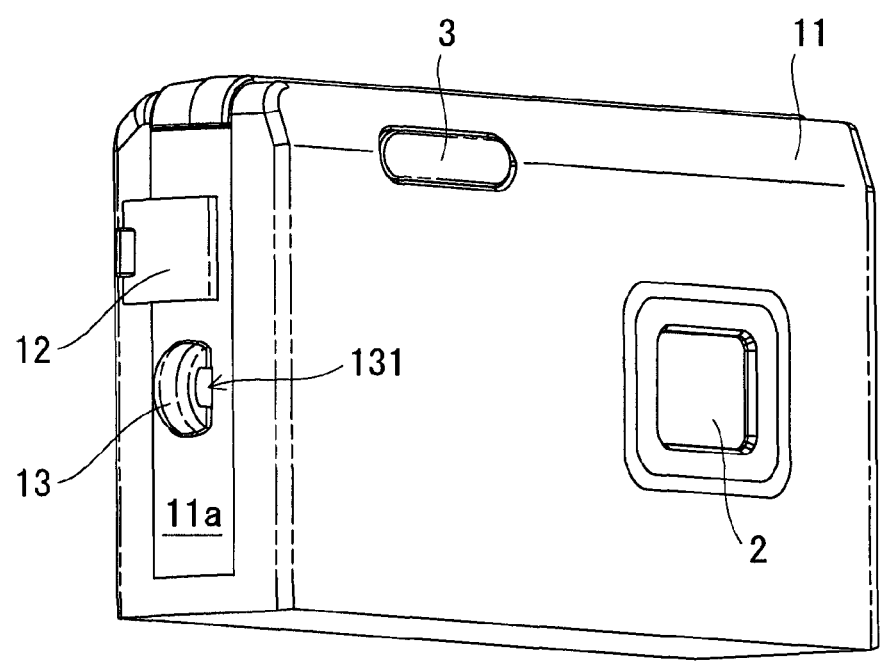
FIG. 1 is a perspective view of a digital camera of the embodiment of the present invention viewed from its front side.
Figure 2:
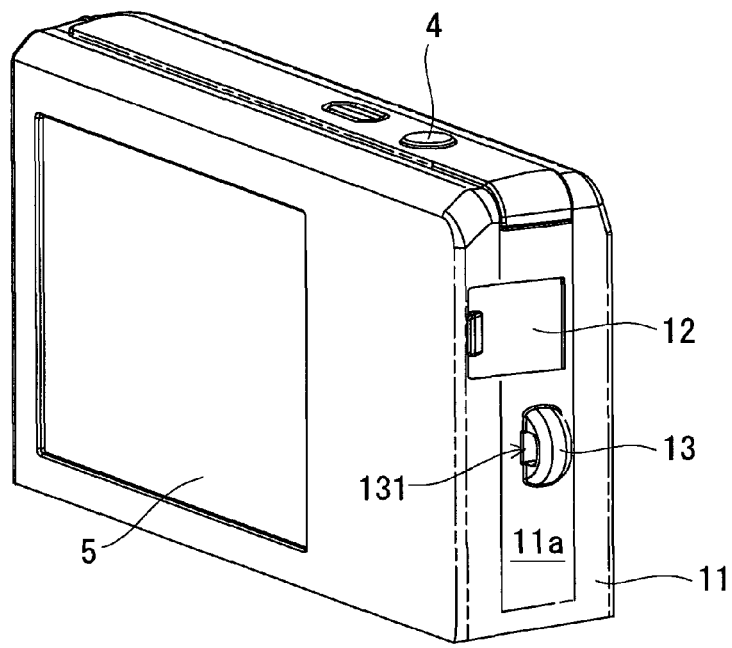
FIG. 2 is a perspective view of the digital camera of the embodiment of the present invention viewed from its rear side.
Figure 3:
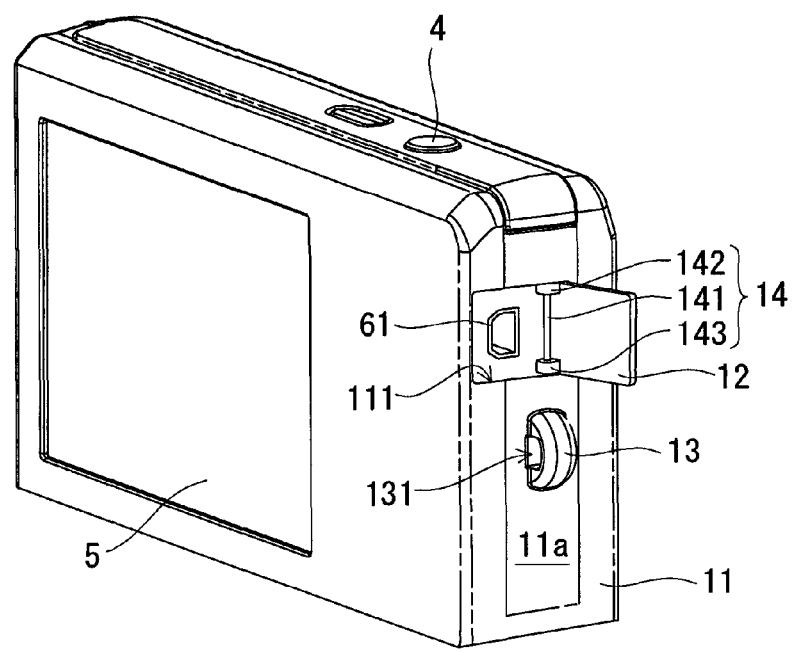
FIG. 3 is a perspective view of the digital camera with a cover body open viewed from its rear side.
Figure 5:
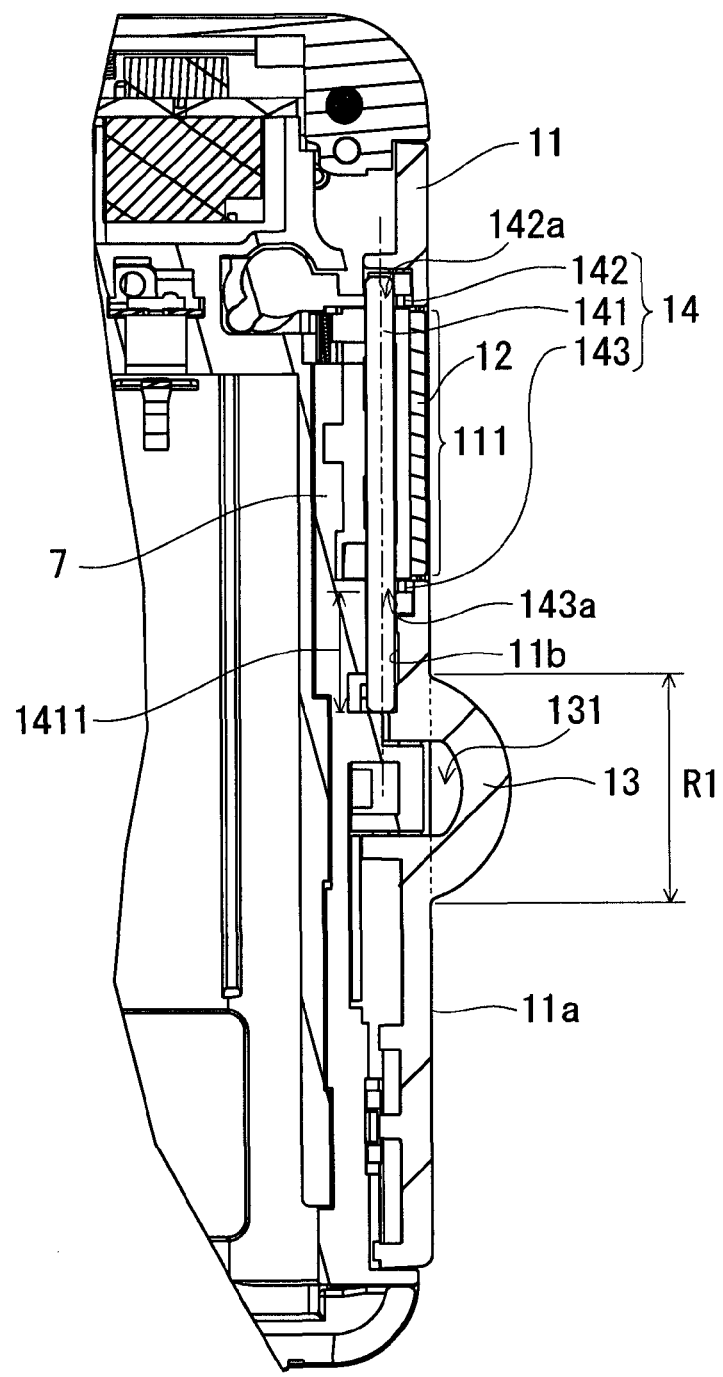
FIG. 5 is a cross-sectional view taken along the line V-V shown in FIG. 4.

As shown in FIGS. 1-3, a digital camera according to an embodiment of the present invention comprises a cabinet 11, a cover body 12, an attaching part 13, and a pivoting mechanism 14. The cabinet 11 includes an imaging mechanism 2 necessary for taking an image, a flash lamp 3, an operation part 4, and a display part 5 provided thereto. The cabinet 11 is fixed to a chassis 7 of the digital camera as shown in FIG. 5. Although the cabinet 11 is made of aluminum in the digital camera of this embodiment, it is also possible to adopt a cabinet made of resin in order to realize the weight saving of the digital camera or reduction in manufacturing cost.

As shown in FIG. 3, an opening 111 is defined in a front surface 11a of the cabinet 11. A USB (Universal Serial Bus) port 61 is provided at a position inside the cabinet 11 which is seeable through the opening 111, and a USB cable can be connected to the USB port 61 from outside the cabinet 11. Thus, it is possible to transfer an image taken by the digital camera to other memory devices via the USB cable.

The cover body 12 is pivotally supported to the cabinet 11 by the pivoting mechanism 14, which is to be described later, so that the opening 111 is openable and closable. In particular, the cover body 12 is attached to a shaft 141 which is a component of the pivoting mechanism 14. In FIG. 2, the cover body 12 is closed and the USB port is hidden by the cover body 12. In contrast, in FIG. 3, the cover body 12 is open and the USB port is seeable through the opening 111.

The attaching part 13 projects from the front surface 11a of the cabinet 11 at a position adjacent to the pivoting mechanism 14 which is to be described later. In particular, the attaching part 13, as shown in FIG. 3, projects from the front surface 11a on which the cover body 12 is pivotally supported by the pivoting mechanism 14 in the cabinet 11.

Figure 4:
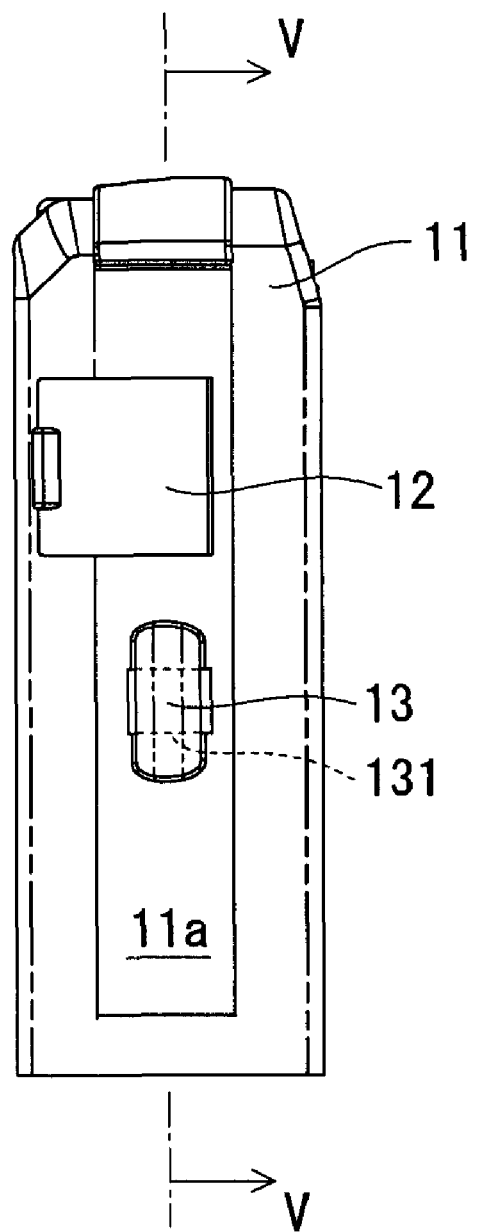
FIG. 4 is a side view of the digital camera of the embodiment of the present invention.

The attaching part 13, as shown in FIGS. 4 and 5, has a through-hole 131 for attaching a string-like member such as a strap. Since the attaching part 13 projects from the front surface 11a of the cabinet 11, it is possible for the through-hole 131 to penetrate the attaching part 13 on the outside of the front surface 11a as shown in FIG. 5. Disposing the through-hole 131 on the outside of the front surface 11a makes it easy to attach the string-like member.

As shown in FIGS. 3 and 5, the pivoting mechanism 14 comprises the shaft 141 and a pair of bearings 142, 143. The shaft 141 is made of metal, and is less likely to have flexure than the cabinet 11 made of resin. The bearings 142, 143, as shown in FIG. 5, are disposed on both sides of the opening 111 respectively, and have coaxial through-holes 142a, 143a through which the shaft 141 passes. The pair of bearings 142, 143 is formed integrally with the chassis 7.

The shaft 141 passes through the through-holes 142a, 143a to be supported by the pair of bearings 142, 143, and projects toward the attaching part 13 from one of the bearings 143 which is closer to the attaching part 13. A projecting part 1411 projecting from the one of the bearings 143 toward the attaching part 13 is disposed within the cabinet 11, extending along a back surface 11b which is the reverse side of the front surface 11a of the cabinet 11.

In the digital camera of this embodiment, the projecting part 1411 extends to a position corresponding to a region R1 in which the attaching part 13 is formed within the cabinet 11. In particular, the projecting part 1411 extends to the position overlapping with the region R1, and an end of the projecting part 1411 is located in the region R1.

According to the digital camera described above, the projecting part 1411 of the shaft 141 which is a component of the pivoting mechanism 14 projects toward the attaching part 13 from the one of the bearings 143 which is closer to the attaching part 13, while the projecting part 1411 extends along with the back surface 11b which is the reverse side of the front surface 11a of the cabinet 11. Therefore, the projecting part 1411 can receive the external force by supporting the back surface 11b of the cabinet 11. It is thus possible to prevent the plastic deformation and breakage of the cabinet 11.

In particular, the cabinet 11 made of resin elastically deforms due to the external force applied to the attaching part 13 to come into contact with the projecting part 1411 of the shaft 141. Any further deformation is prevented by the projecting part 1411. Thus, prevented is the plastic deformation and breakage of the cabinet 11.

In the digital camera described above, the projecting part 1411 of the shaft 141 overlaps with the region R1 in which the attaching part 13 is formed. Even when a greater external force is applied to the attaching part 13, the projecting part 1411 can receive the force by supporting the back surface 11b of the cabinet 11.

Furthermore, according to the digital camera described above, since the plastic deformation and breakage is prevented by means of the shaft 141 which is necessary to pivotally support the cover body, the size or manufacturing cost of the digital camera does not increase.

2. Modifications

2-1. Modification 1

Figure 6:
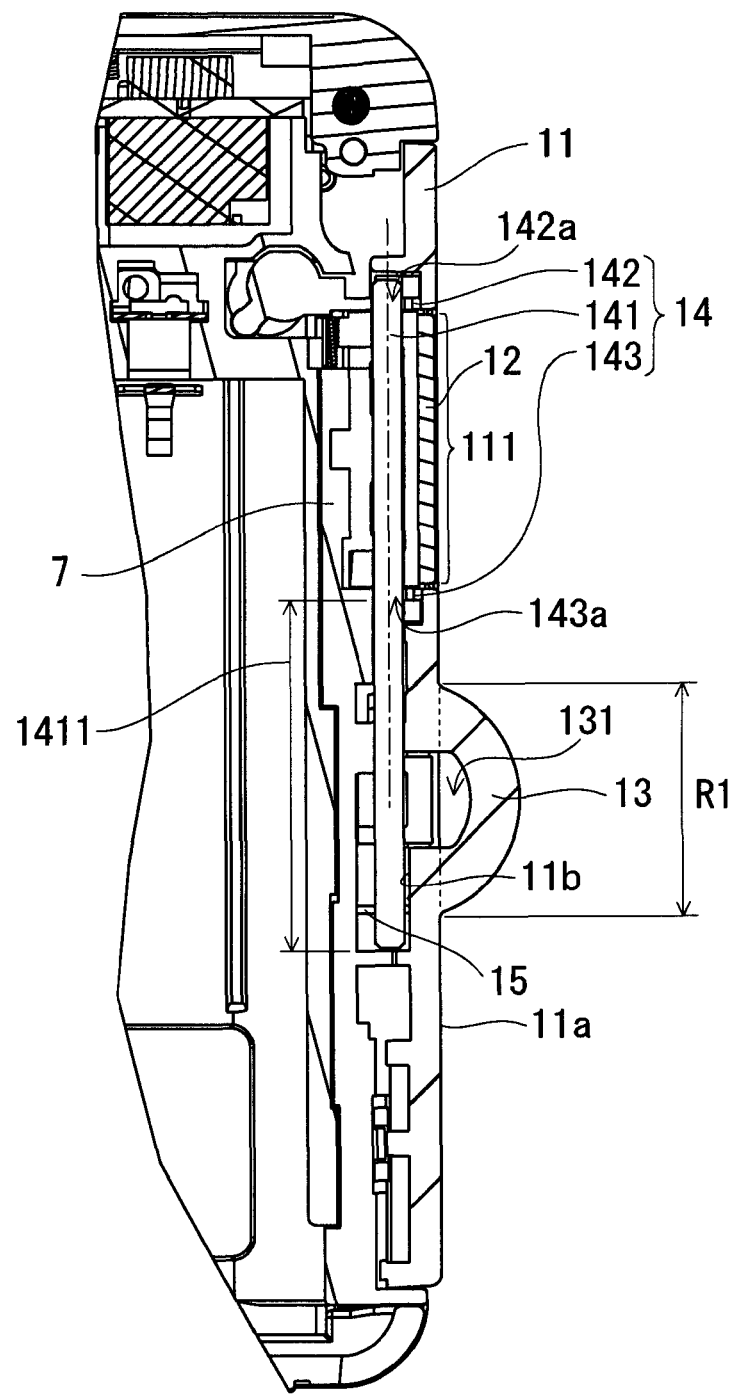
FIG. 6 is a cross-sectional view of the digital camera according to the modification 1 or 2 showing its main part.

In the digital camera described above, the projecting part 1411 of the shaft 141 extends so that its end is located in the region R1. However, as shown in FIG. 6, the projecting part 1411 may project beyond the region R1. According to the digital camera of this modification, even when a greater external force is applied to the attaching part 13, the projecting part 1411 can receive the force by supporting the back surface 11b of the cabinet 11. Therefore, it is possible to better prevent the plastic deformation and breakage of the cabinet due to the external force.

2-2. Modification 2

It is preferable that, as shown in FIG. 6, the tip portion of the projecting part 1411 of the shaft 141 is supported by a third bearing 15 to reduce the flexure of the shaft 141 at the time the projecting part 1411 receives the external force applied to the attaching part 13. Therefore, even when a greater external force is applied to the attaching part 13, the projecting part 1411 can receive the force by supporting the back surface 11b of the cabinet 11.

2-3. Modification 3

Figure 7:
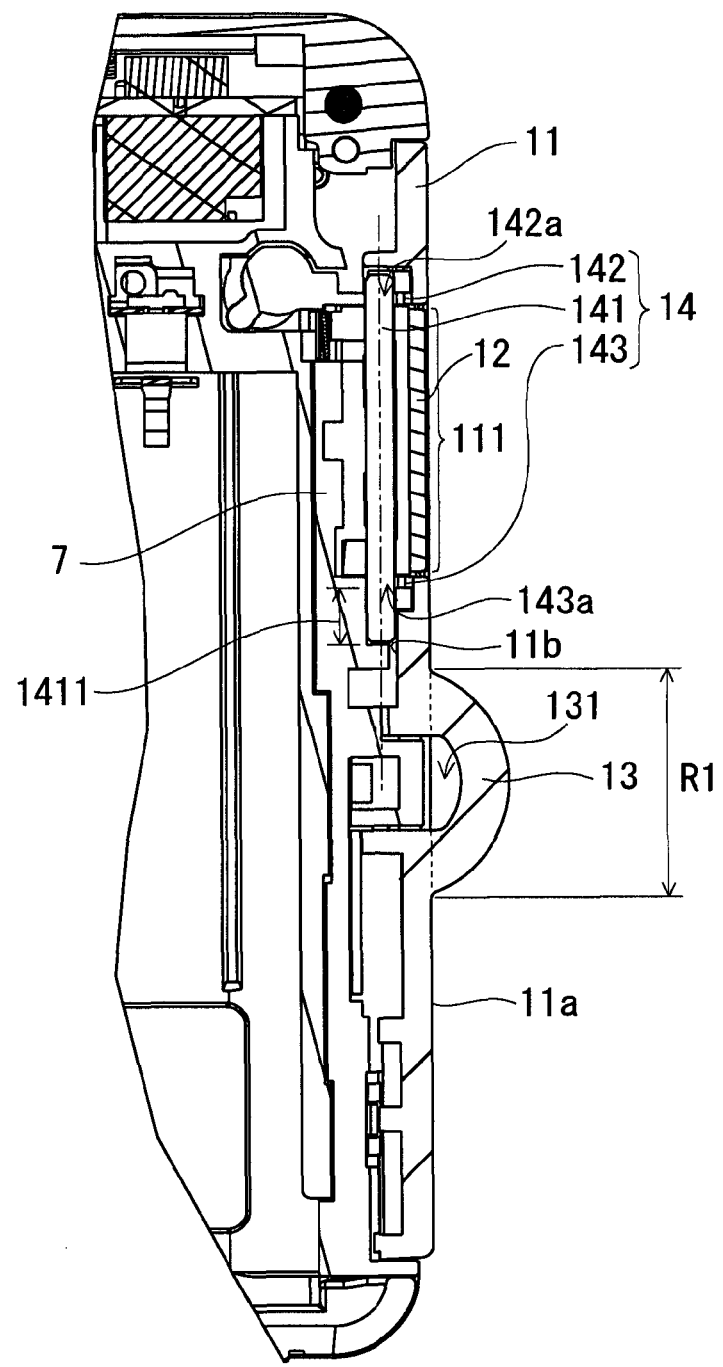
FIG. 7 is a cross-sectional view of the digital camera according to the modification 3 showing its main part.

In the digital camera described above, even in the case where the projecting part 1411 does not overlap with the region R1 as shown in FIG. 7, the projecting part 1411 can receive the external force similarly to the digital camera described above as long as the projecting part 1411 projects toward the attaching part 13 from the one of the bearings 143 which is closer to the attaching part 13, while the projecting part 1411 extends along with the back surface 11b. Still, the projecting part 1411 of the digital camera described above can receive a greater external force than that of the digital camera of this modification.

Even in the configuration in which the projecting part 1411 does not overlap with the region R1, the projecting part 1411 can receive a greater external force in the case where the projecting part 1411 extends to a position adjacent to the region R1 (a position corresponding to the region R1) or the projecting part 1411 passes beside the region R1.

2-4. Modification 4

In the digital camera described above, the cabinet 11 made of resin and the shaft 141 made of metal are adopted. However, without limitation to the above, the cabinet 11 and the shaft 141 may be made of various materials respectively.

However, it is preferable to adopt a material less likely to have a flexure for the shaft 141 than that for the cabinet 11.

The structure of each part of the present invention is not limited to the above embodiment, and various modifications may be made within the technical scope set forth in the claims. For example, the art described above may be adopted in various portable electronic devices such as a portable telephone or a video camera.

What is claimed is:

1. A portable electronic device comprising a cabinet including an opening defined in a front surface thereof, a cover body opening and closing the opening of the cabinet, and a pivoting mechanism for pivotally supporting the cover body to the cabinet, the pivoting mechanism comprising a shaft and a pair of bearings supporting the shaft, the cabinet having an attaching part for attaching a string-like member, the attaching part projecting from the front surface of the cabinet, wherein the attaching part is disposed adjacent to the pivoting mechanism, the shaft which is a component of the pivoting mechanism includes a projecting part projecting toward the attaching part from one of the bearings closer to the attaching part, and the projecting part extends along a back surface which is a reverse side of the front surface of the cabinet.

2. The portable electronic device according to claim 1, wherein the projecting part of the shaft extends to a position corresponding to a region in which the attaching part is formed within the cabinet.

3. The portable electronic device according to claim 2, wherein the projecting part of the shaft has a tip portion supported by a third bearing.

4. The portable electronic device according to claim 2, wherein the projecting part of the shaft projects beyond the region in which the attaching part is formed within the cabinet.

5. The portable electronic device according to claim 4, wherein the projecting part of the shaft has a tip portion supported by a third bearing.

* * * * *